United States Patent [19]

Liechti et al.

[11] 4,453,944
[45] Jun. 12, 1984

[54] DYE STABLE TO DYEING, PROCESSES FOR PRODUCING IT, AND ITS USE FOR DYEING AND PRINTING SYNTHETIC AND SEMI-SYNTHETIC FIBRE MATERIALS

[75] Inventors: Peter Liechti, Arisdorf; Antoine Clément, Basel; Peter Eugster, Arlesheim; Kurt Meyer, Riehen, all of Switzerland

[73] Assignee: Ciba-Geigy Corporation, Ardsley, N.Y.

[21] Appl. No.: 479,291

[22] Filed: Mar. 28, 1983

[30] Foreign Application Priority Data

Apr. 7, 1982 [CH] Switzerland .................. 2141/82

[51] Int. Cl.³ .............................................. D06P 67/02
[52] U.S. Cl. .............................................. 8/526; 8/687; 8/695; 8/922
[58] Field of Search .......................... 8/526, 687, 695

[56] References Cited

U.S. PATENT DOCUMENTS

| | | | |
|---|---|---|---|
| 2,007,382 | 7/1935 | Ockman et al. | 8/526 |
| 4,074,965 | 2/1978 | Kruse et al. | 8/662 |
| 4,319,880 | 3/1982 | Opitz et al. | 8/526 |
| 4,327,999 | 5/1982 | Koller et al. | 8/526 |
| 4,332,588 | 6/1982 | Eugster et al. | 8/526 |
| 4,374,640 | 2/1983 | Tappe et al. | 8/526 |
| 4,388,078 | 6/1983 | Thomas et al. | 8/514 |

FOREIGN PATENT DOCUMENTS 508701 7/1971 Switzerland .

Primary Examiner—A. Lionel Clingman
Attorney, Agent, or Firm—Edward McC. Roberts

[57] ABSTRACT

There is described a novel modification of the dye of the formula

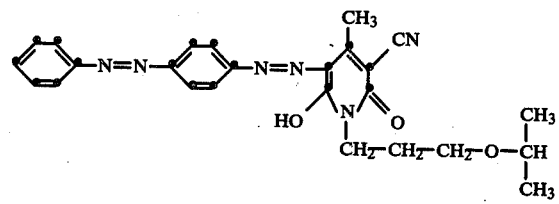

which is characterized by the data given in claim 1. This novel modification is suitable in particular for dyeing wound packages of polyester materials under HT conditions, materials dyed in a golden-yellow shade being obtained.

2 Claims, 1 Drawing Figure

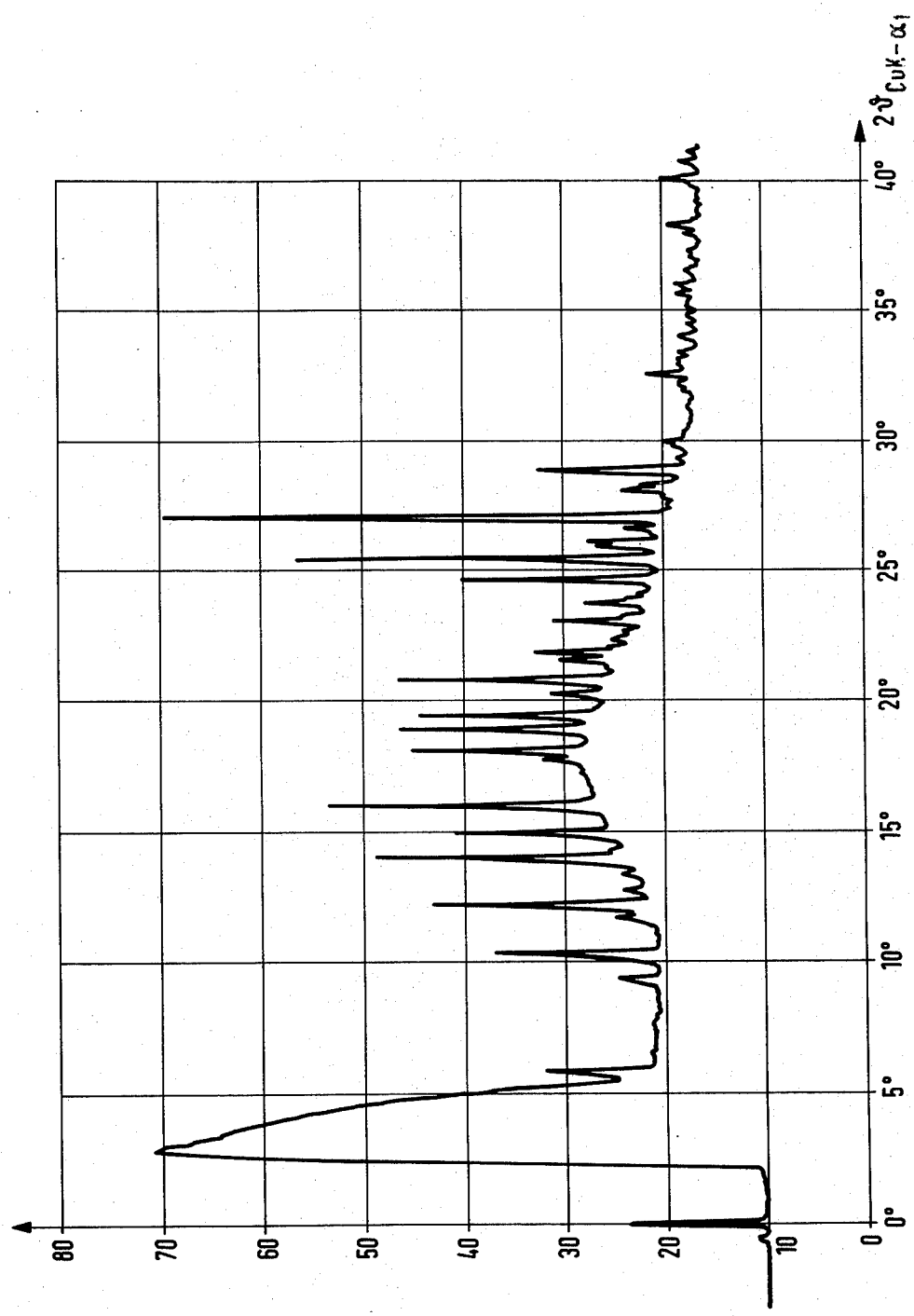

DYE STABLE TO DYEING, PROCESSES FOR PRODUCING IT, AND ITS USE FOR DYEING AND PRINTING SYNTHETIC AND SEMI-SYNTHETIC FIBRE MATERIALS

From the Swiss Patent Specification No. 508 701 is known the dye of the formula

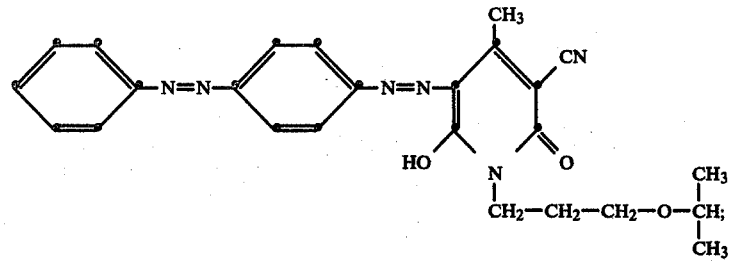

and likewise the use thereof for dyeing and printing textile material, especially polyester fibre material. When this dye is applied in an aqueous dispersion under HT conditions, the dyeings obtained are useless since they exhibit effects caused by the dye crystallising out and becoming filtered off.

The object of the present invention was to convert this dye into a form which would not have the stated disadvantages. The solution found lay in a novel crystal form of the dye.

The present invention thus relates to a novel modification of the dye stable to dyeing (in the following designated as the B-modification) of the formula

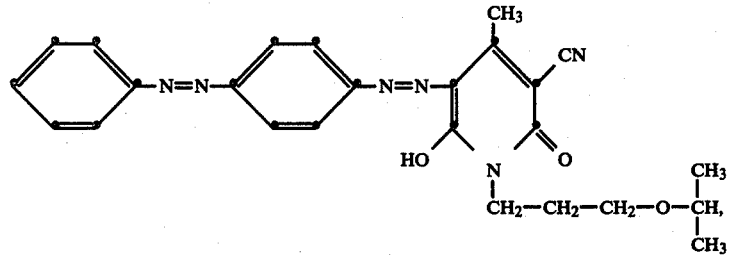

characterised by the X-ray diffraction pattern shown in FIG. 1 (Cuk-$\alpha_1$ radiation) with the characteristic reflexes, and the d values of the interplanar spacings calculated from the diffraction pattern:

| d(Å) | 15.1 | 8.5 | 7.2 | 6.3 | 5.93 | 5.56 | 4.91 | 4.71 |
|---|---|---|---|---|---|---|---|---|
| I* | m | m | s | s | m | s | m | m |
| d(Å) | 4.58 | 4.29 | 3.87 | 3.62 | 3.51 | 3.31 | 3.10 | |
| I* | m | m | m | m | s | ss | m | |

I* = intensity.

wherein only the lines of very strong (ss), strong (s) and medium (m) relative intensity are taken into account.

The amorphous modification of the stated dye is known, this modification being obtained by the coupling of diazotised 4-aminoazobenzene with 1-isopropoxypropyl-3-cyano-6-hydroxy-4-methyl-2-pyridone in an aqueous medium. This amorphous modification has however no great level of stability; it converts for example on standing overnight in an aqueous medium at room temperature into a crystalline modification, referred to in the following as the A-modification: but even this A-modification still has the disadvantages mentioned when it is applied in aqueous dispersion under HT conditions.

The novel B modification stable to dyeing, according to the present invention, is obtained by various methods of preparation, for example:

(a) by heating the dye in the dry state to temperatures above its melting point (above 140° C.), or (b) by heating the aqueous suspension of the dye to temperatures above 90° C., preferably 93°–100° C., particularly 95°–98° C., and maintaining the suspension at this temperature. The aqueous suspension can be obtained by starting directly with the synthesis suspension and not isolating the dye, or by isolating the dye and subsequently suspending it in water. It is then possible to heat this aqueous suspension as such, or to pass steam into the aqueous suspension. The procedure is carried out if necessary in the presence of surfactants (tensides), of nonionic, anionic or cationic nature, and optionally of further additives, such as anti-foaming agents.

A further possibility is to heat the aqueous suspension under pressure to temperatures of above 120° C.

Surfactants suitable for the purpose are for example the addition product of 10 mols of ethylene oxide with 1 mol of nonylphenol, a mixture of alkyldimethylbenzylammonium chlorides, a dodecyl ether of the ethylene oxide/propylene oxide block polymer, or tertiary organic phosphoric acid esters of the addition product of 2 mols of ethylene oxide with 1 mol of lauryl alcohol.

In the preferred production variant, the procedure is to start directly with the aqueous coupling suspension, as is obtained after coupling in the production of the dye, and to pass steam into the suspension, in the course of which the dye firstly converts into a suspension of the orange to brown A-modification. Above about 93° C., the colour of the suspension turns red, a change which indicates the transformation to the B-modification. The time required in practice to effect this is 0.2 to 10 hours, especially 1 to 3 hours. Crystallisation can if required be initiated by the addition of seed crystals of the B modification. After the resulting B-modification has been produced, it is separated from the aqueous phase for example by filtration, and then subjected to a known finishing operation. A further possible method of producing the B-modification consists in:

(c) heating the dye in an organic solvent; suitable organic solvents are for example: alcohols, such as methanol, ethanol or butanol, or glycols, and also ethers such as dioxane or glycol ether. The dye is heated in these solvents to temperatures of 60° C. to about 20° C. below the boiling temperature of the solvent concerned.

The conversion of the dye (amorphous or A-modification) into the crystalline B-modification can be easily followed by recording X-ray diffraction spectra and determining melting points. Thus, the dye (amorphous-/A-modification) has a melting point of about 140° C., and is in the form of a brownish-orange powder, whereas the B-modification consists of red crystals having a melting point of 157°–159° C.

In order to obtain dye preparations technically suitable for dyeing and printing, the B-modification according to the invention can be converted into a very finely divided form by customary methods, if necessary in the presence of water and suitable dispersing agents, together with other conventional additives.

To obtain the B-modification of the invention in the optionally finely divided form, the customary devices are suitable, such as mills, for example ball mills, vibratory mills, sand mills or kneaders. Suitable dispersing agents are for example: condensation products of mono- or poly-nuclear aromatic compounds, such as naphthalene, naphthols, phenols or sulfonic acids thereof, with formaldhyde, or with other substances which can undergo a condensation reaction with aromatic rings, such as urea, ethylene oxide or isocyanates, optionally with the addition of sodium sulfite, also lignin sulfonates and nonionic or anionic surface-active compounds.

Under dyeing conditions such as high temperature and the presence of dyeing auxiliaries, the novel B-modification undergoes no change with regard to crystal size and crystal form, so that the dyeing properties and the stability of the dispersion are not impaired, which is in contrast to the impairment occurring under such dyeing conditions in the case of the amorphous dye, and the A-modification thereof, which are unstable to dyeing.

The novel dye modification (B) converted into the very finely divided form is extremely suitable for dyeing synthetic and semi-synthetic textile materials, such as synthetic, straight-chain polyesters, for example polyethylene glycol terephthalate, or polymers chemically synthesised in an analogous manner, and semi-synthetic fibre materials, such as cellulose triacetate, at temperatures approximately between 100° and 220° C. The novel dye of the B-modification is stable to dispersion under dyeing conditions, and does not have the disadvantages of the unstable A-modification of the stated dye obtainable in the customary manner, that is to say, disadvantages which, in dyeing processes in which the dyes are subjected to high temperature for a considerable length of time in an aqueous medium, result in the dye flocculating and becoming filtered off, effects that frequently lead to unlevel dyeings with poor fastness to rubbing. Particularly in the dyeing of wound packages—for example cheeses—, there is no occurrence with the use of the novel B-modification of agglomeration and flocculation and finally the filtering off of the dye on the bobbins even when the dye liquor is only slowly exhausted, or when dyeing is performed with such a large dye excess that an exhaustion of the dye bath never occurs. The novel dye modification is therefore very well suited in particular in the machine dyeing of loose materials, and for the dyeing of cheeses or bobbins, or for the dyeing of yarns.

Except where otherwise stated in the following Examples, the term 'parts' denotes parts by weight.

The X-ray diffraction pattern was recorded with CuK-α1 radiation ($\lambda = 1.5405$ Å). The reference substance used was α-quartz. The d-values thereof are calculated from $a_o = 4.913$ Å and $c_o = 5.405$ Å.

The intensity is given in five stages as follows:

| Stage | Intensity | Abbreviation |
|---|---|---|
| 1 | very strong | ss |
| 2 | strong | s |
| 3 | medium | m |
| 4 | weak | sch |
| 5 | very weak | ssch |

EXAMPLE 1

78.8 g (0.4 mol) of 4-aminoazobenzene are stirred overnight in 144 ml of water and 144 g of 30% aqueous hydrochloric acid in the presence of 4 g of an ethylene oxide/propylene oxide block polymer based on lauryl alcohol; the formed suspension is subsequently diluted with 456 ml of water, and the mixture is diazotised, by the addition of 100 ml of N sodium nitrite solution, at 20°–24° C. within about 40 minutes. The filtrated, dark-brown diazonium salt solution is then added, in the course of 25 minutes, to a solution of 110 g (0.44 mol) of 1-isopropoxypropyl-3-cyano-6-hydroxy-4-methyl-2-pyridone in 800 ml of water and 44 ml of 30% aqueous sodium hydroxide solution, the pH-value being held between 3 and 5 by the addition of further sodium hydroxide solution. After completion of coupling, the pH-value of the orange suspension is adjusted to 11.5, and steam is then fed into the reaction mixture. A temperature of 95° C. is reached after about 20 minutes, and heating is continued under steam distillation conditions. The colour of the suspension changes in the first 5 minutes from orange to a full shade of red, and after 15 minutes there are practically no further orange constituents present. Stirring is maintained for a further 15 minutes; the temperature is afterwards lowered to 60° C., and the crystal sludge is filtered off with suction. The residue is washed neutral and dried to thus yield 173 g (94.5% of theory) of the dye of the formula

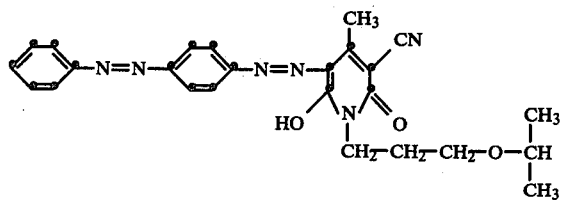

in the form of signal red crystals, m.p. 157°–159° C. (B modification).

EXAMPLE 2

10 parts of the B-modification of the dye, stable to dyeing and produced according to Example 1, with the addition of 5 parts of a condensation product of a naphthalenesulfonic acid with formaldehyde in 60 parts of water are ground, by means of a glass-bead mill, until an adequate fine division of the particles is obtained. There are subsequently added 15 parts of an oxylignin sulfonate, and the mixture is dried in a spray dryer.

In a pressure dyeing apparatus, 40 g of the dye dispersion thus obtained are suspended in 40 liters of water at 70° C. containing 4 g of oleylpolyglycol ether. The pH-value of the dyeing bath is adjusted to 4 to 5 with acetic acid. A wound package of 2000 g of polyethylene glycol terephthalate yarn is dyed in this bath by raising the temperature of the dyeing liquor within 30 minutes from 70° to 130° C., and holding the bath at this temperature for 50 minutes. After the dyeing has been finished in the customary manner, the result is a wound package evenly dyed in an intense golden-yellow shade without stains or precipitation of the dye on the material.

When 10 parts of the amorphous or A-modification of the dye is used in place of the B-modification, the procedure otherwise being the same as that described in the foregoing, there is obtained a dyeing which is golden-yellow in shade but which is uneven and not fast to rubbing, and which exhibits signs of dye precipitation on the surface.

What is claimed is:

1. A crystalline modification of the dye of the formula

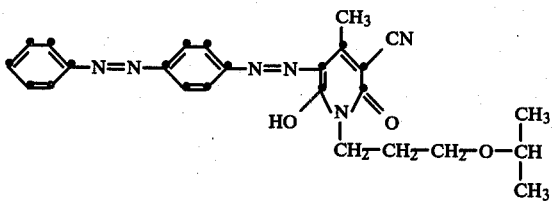

which modification is stable to dyeing and which is characterized by the X-ray diffraction pattern shown in FIG. 1 (CuK-$\alpha_1$ radiation) with the characteristic reflexes, and the d values of the interplanar spacings calculated from the diffraction pattern:

| d(Å) | 15.1 | 8.5 | 7.2 | 6.3 | 5.93 | 5.56 | 4.91 | 4.71 |
|------|------|-----|-----|-----|------|------|------|------|
| I*   | m    | m   | s   | s   | m    | s    | m    | m    |
| d(Å) | 4.58 | 4.29 | 3.87 | 3.62 | 3.51 | 3.31 | 3.10 |      |
| I*   | m    | m    | m    | m    | s    | ss   | m    |      |

I* = intensity.

2. A process for producing the crystalline modification of claim 1, which process comprises:
 (a) heating the amorphous dye in the dry state to a temperature above 140° C.;
 (b) heating the amorphous dye in an aqueous suspension to a temperature above 90° C.; or
 (c) heating the amorphous dye, in an organic solvent selected from the group consisting of lower alkanols, glycols, dioxane and glycol ethers, to a temperature of 60° C. to 20° C. below the boiling temperature of the selected solvent.

* * * * *